Oct. 20, 1970     W. B. MAURO     3,534,570
LOCK FOR AUTOMOBILE HUB CAP
Filed Oct. 30, 1968     4 Sheets-Sheet 1
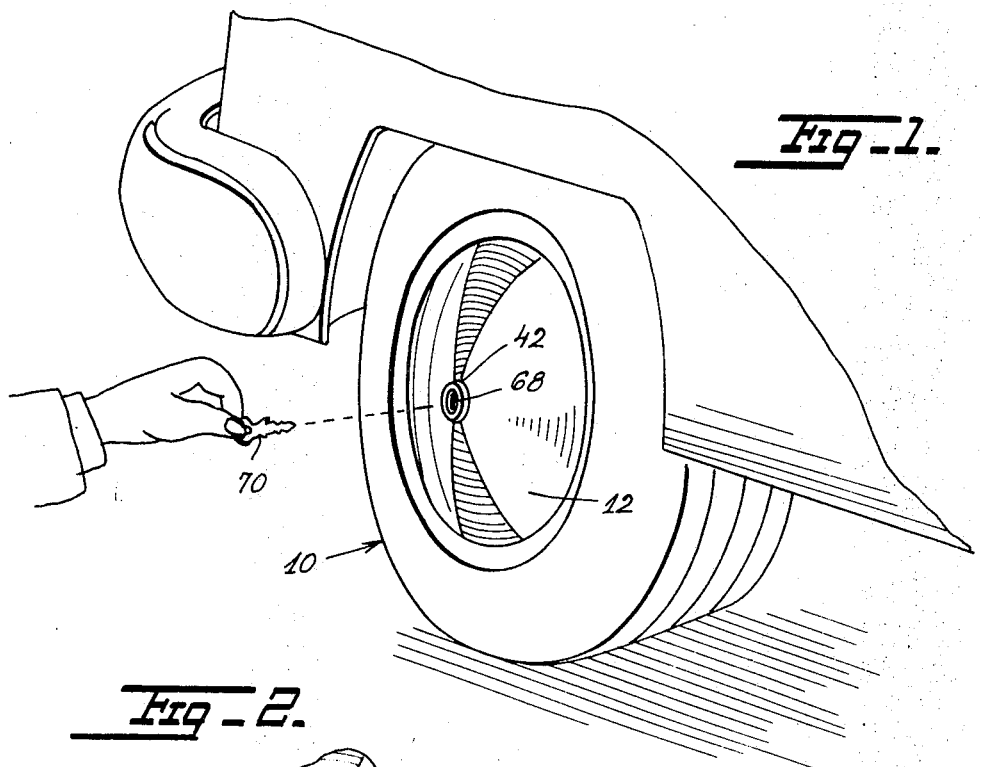
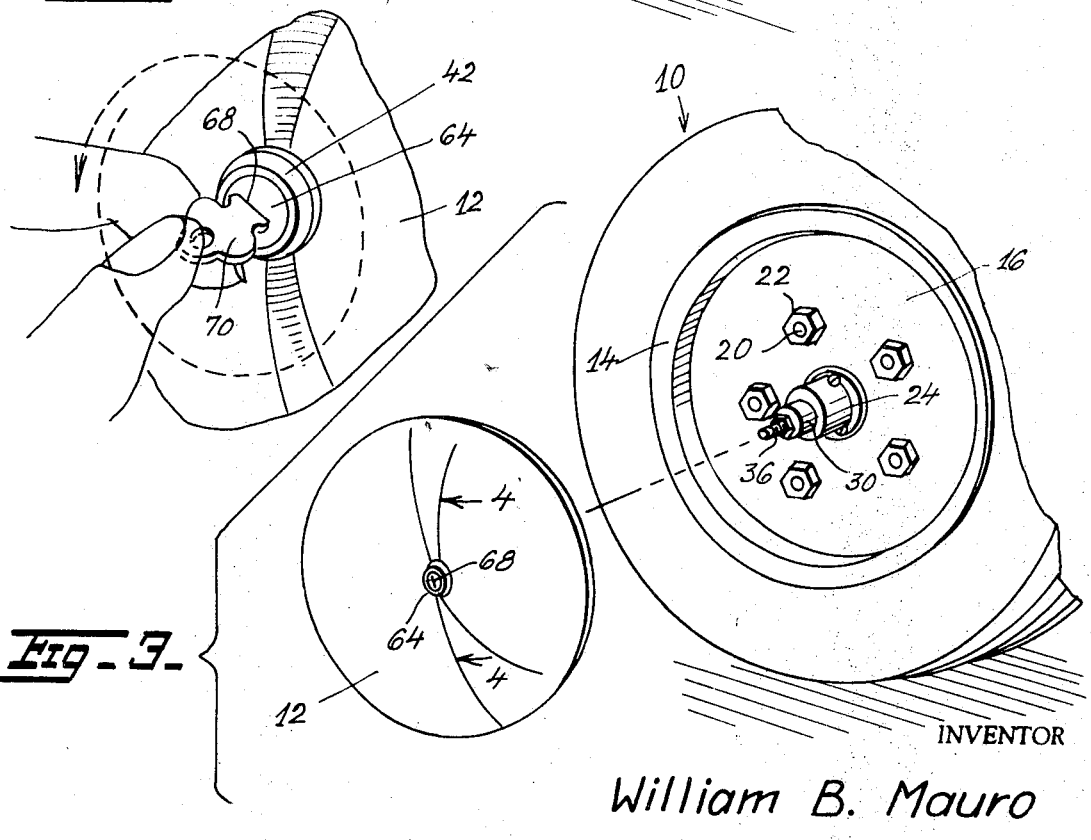
INVENTOR
William B. Mauro
BY Polachek & Saulsbury
ATTORNEYS Oct. 20, 1970 — W. B. MAURO — 3,534,570
LOCK FOR AUTOMOBILE HUB CAP
Filed Oct. 30, 1968 — 4 Sheets-Sheet 2
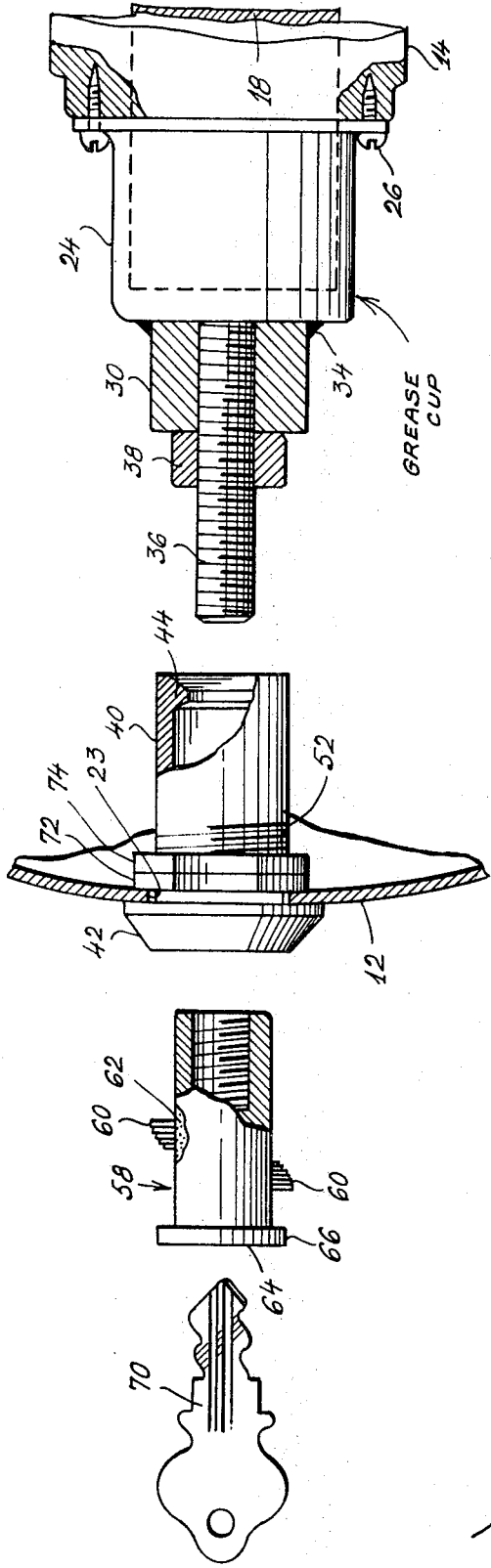
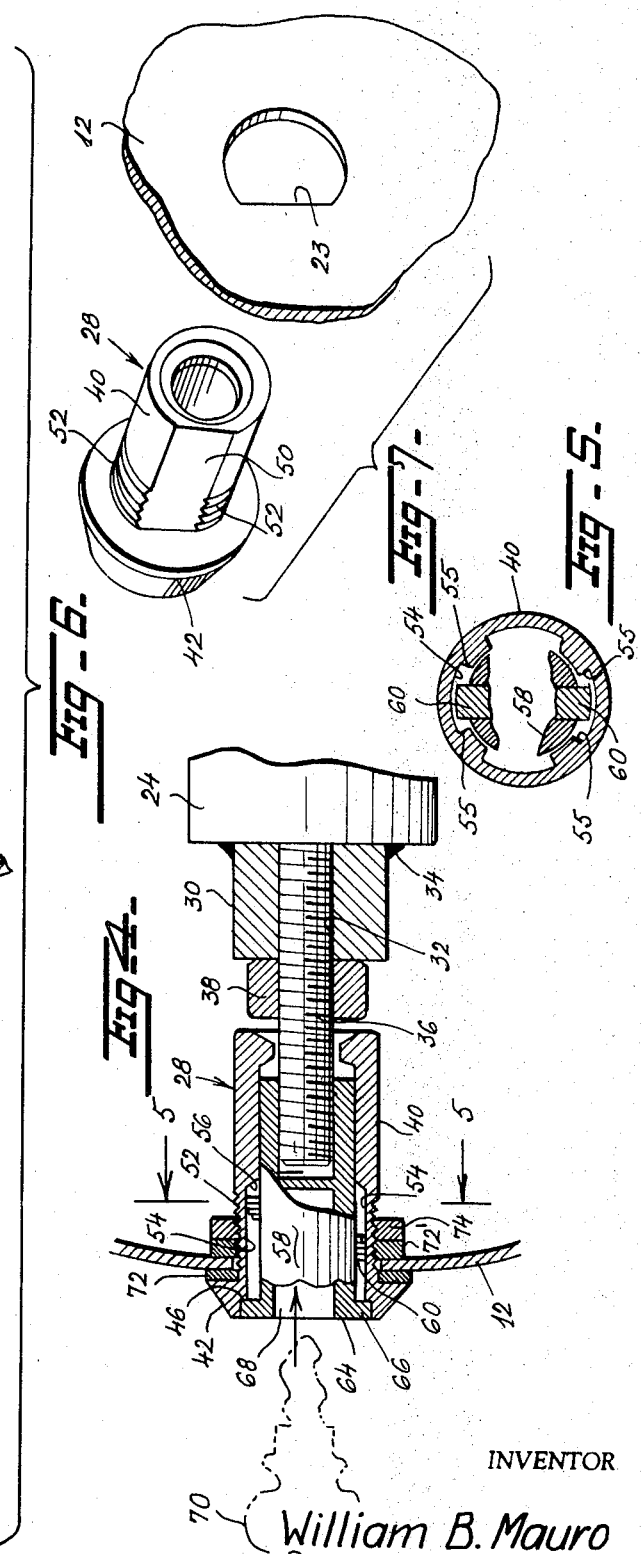
INVENTOR
William B. Mauro
BY Polachek & Saulsbury
ATTORNEYS

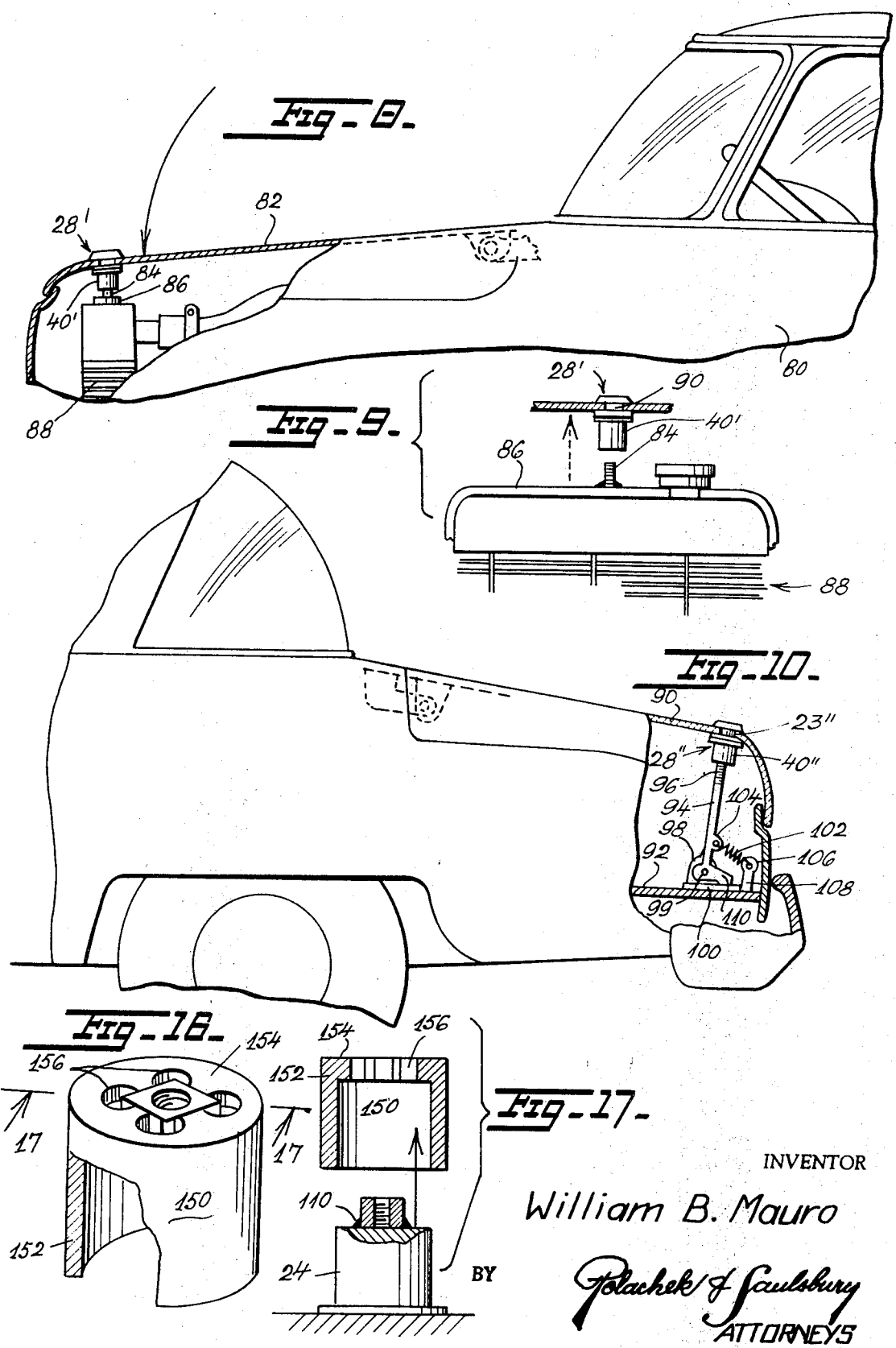

Oct. 20, 1970     W. B. MAURO     3,534,570
LOCK FOR AUTOMOBILE HUB CAP
Filed Oct. 30, 1968     4 Sheets-Sheet 4
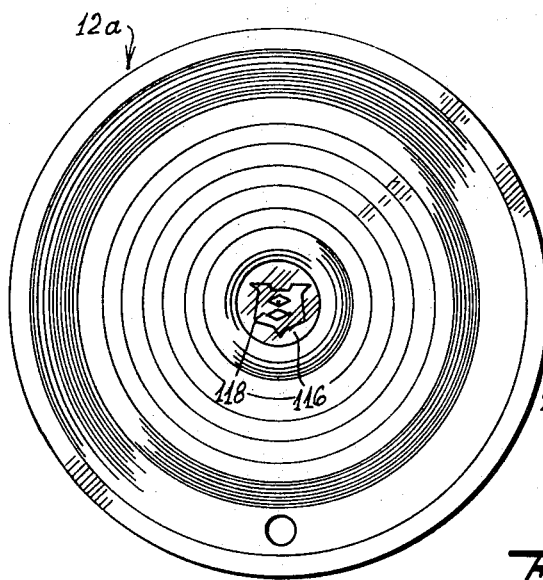
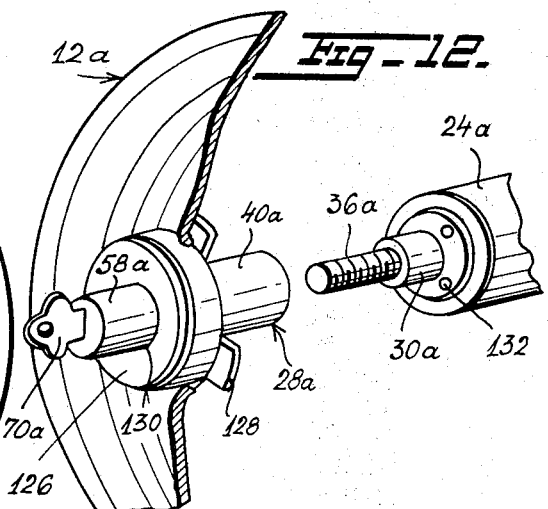
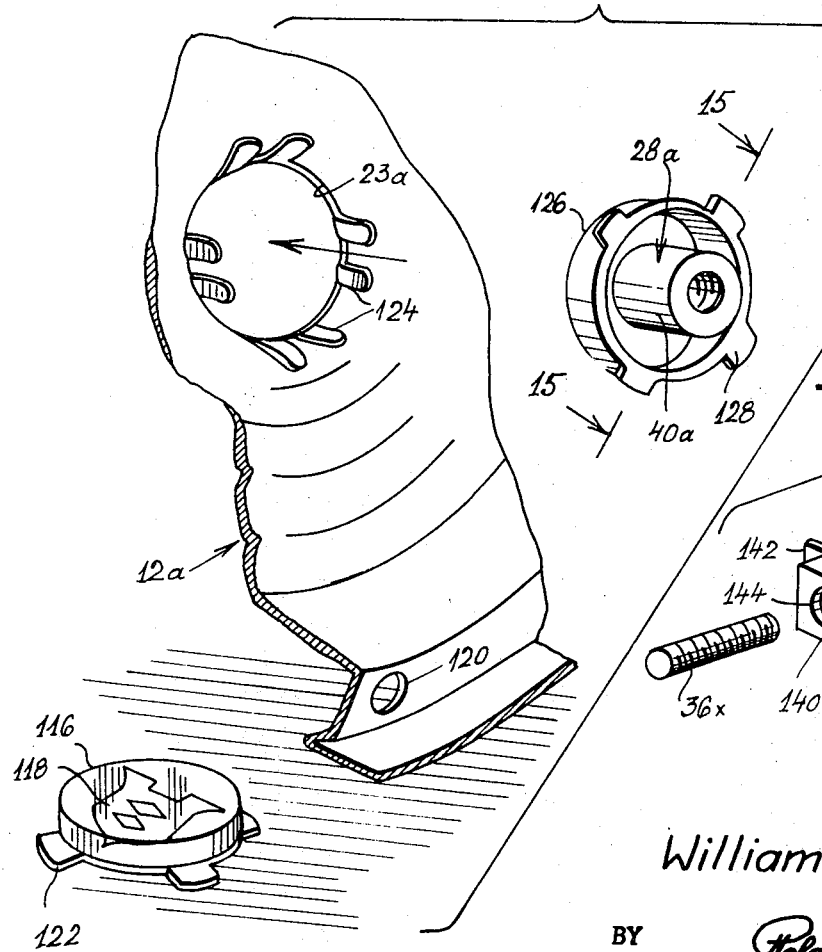
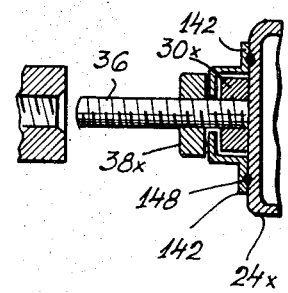
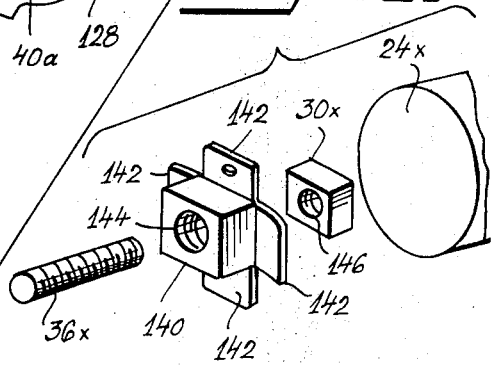
INVENTOR
William B. Mauro
BY Polachek & Saulsbury
ATTORNEYS United States Patent Office 3,534,570
Patented Oct. 20, 1970

1

3,534,570
LOCK FOR AUTOMOBILE HUB CAP
William B. Mauro, 172 Lawrence Ave.,
Brooklyn, N.Y. 11230
Filed Oct. 30, 1968, Ser. No. 777,973
Int. Cl. E05b 65/12
U.S. Cl. 70—167                                1 Claim

ABSTRACT OF THE DISCLOSURE

Locking mechanism for locking the hub cap on the road wheel of an automobile. The circular hub cap is formed with a central opening in which is fitted a lock assembly including a casing, removable barrel in the casing containing locking mechanism of the tumbler type. The barrel is internally threaded for fastening the casing, barrel and locking mechanism to an externally threaded stem protruding from the grease cup on the end of the axle mounting the road wheel. The locking mechanism in the barrel is actuated by a key.

---

According to a modification an adapter is provided for using the locking mechanism to lock the hood of an automobile against unauthorized opening, and another modification discloses an adapter for using the locking mechanism for locking the cover of the trunk compartment of an automobile against unauthorized opening.

A primary object of the invention is to provide a hub cap that may be readily locked in position on an automobile road wheel that will prevent the unauthorized or inadvertent removal of the hub cap from the wheel.

Another object of the invention is to provide an adapter for the road wheel brake drum of an automobile for mounting a hub cap in locked position on the end of the brake drum.

Still another object of the invention is to provide a template for mounting an adapter on the end of the grease cup of an automobile for locking a hub cap to the brake drum.

Various objects, features and advantages of the invention will become apparent upon reading the following specification together with the accompanying drawing forming a part thereof.

Referring to the drawing:

FIG. 1 is a perspective view of a hub cap embodying the invention and shown mounted on a wheel of an automobile, a key being shown preparatory to being inserted in the hub cap for operating the locking mechanism thereof.

FIG. 2 is a fragmentary perspective view of the hub cap showing the key inserted therein in operative position.

FIG. 3 is a fragmentary view similar to FIG. 1 but showing the hub cap removed from the wheel.

FIG. 4 is a sectional view taken on the plane of the line 4—4 of FIG. 3 showing the hub cap in position on the wheel.

FIG. 5 is a cross-sectional view taken on the plane of the line 5—5 of FIG. 4.

FIG. 6 is an enlarged disassembled part elevational and part sectional view of the wheel axle, hub cap and hub cap locking mechanism of the invention and key therefor.

FIG. 7 is a disassembled perspective view of the lock assembly removed from the hub cap.

FIG. 8 is a part elevational and part sectional view of the front of an automobile showing a modification of the invention for locking the hood of an automobile against unauthorized opening, the hood being shown in closed locked position.

FIG. 9 is a fragmentary side elevational and sectional view showing the hood of FIG. 8 partly opened.

2

FIG. 10 is a part elevational and part sectional view of the rear of an automobile showing another modification of the invention for locking the cover of the trunk compartment against unauthorized opening, the cover being shown in closed locked position.

FIG. 11 is a top plan view of a conventional hub cap adapted to be modified for locking attachment to the grease cup of an automobile.

FIG. 12 is a disassembled perspective fragmentary view of a modified form of locking mechanism for locking the hub cap of FIG. 11 onto the grease cup, the hub cap and locking mechanism being shown preparatory to attachment to the adapter on the end of the grease cup.

FIG. 13 is a fragmentary perspective view showing the locking mechanism of FIG. 12 removed from the hub cap and showing the closure plate shown in FIG. 11 removed from the central opening in the hub cap.

FIG. 14 is a spread perspective view of a modified form of adapter for a grease cup for coaction with the locking mechanism of FIG. 1.

FIG. 15 is a vertical sectional view through the parts shown in FIG. 14 in assembled relation, taken on the line 15—15 of FIG. 13, the end of the barrel of the lock assembly of FIG. 1 being shown preparatory to mounting on the threaded stem of the adapter.

FIG. 16 is a perspective view of a tool for fixing an adapter to the end of a grease cup of an automobile, parts being shown broken away.

FIG. 17 is a sectional view taken on the plane of the line 17—17 of FIG. 16, the tool shown being removed from a grease cup.

Referring now in detail to the various views of the drawing, in FIG. 1 an automobile wheel 10 is shown with a hub cap 12 embodying one form of the invention mounted thereon.

In FIG. 3, the wheel is shown provided with a conventional brake drum 14 and a disc portion 16. The brake drum is mounted on the wheel axle 18. The usual bolts 20 and nuts 22 are provided for connecting the wheel 10 to the brake drum 14. The hub cap 12 has the usual central opening 23 and is detachably connected to the wheel disc portion 16 in any one of the well-known ways, usually the snap fit. A grease cup 24 installed on the brake drum 14 by means of screws 26 embraces the end of the axle 18.

In accordance with the present invention, in order to prevent unauthorized removal of the hub cap 12, locking mechanism 28 coacting with a stationary part of the automobile, for example, the grease cup 24 is provided. The grease cup is adapted to coact with the locking mechanism by means of an adapter in the form of a cylindrical block 30 having a central threaded bore 32 fixed to the outer face of the grease cup by welding as indicated at 34. An elongated externally threaded stem or post 36 is threaded into the block 30 and protrudes outwardly thereof. The stem is locked in position in the block by means of a lock nut 38 coacting with the outer face of block 30.

The locking machanism 28 comprises an elongated outer hollow cylindircal casing 40 open at both ends with an external annular tapering head 42 at one end thereof, and with an inwardly extending flange 44 at its other end. Head 42 is formed with an inner shoulder 46 formed with opposed notches 48. The outer surface of the body of the casing is formed with a flat portion 50 extending the length thereof, and with external threads 52 at its end mounting the head 42. A series of spaced recesses 54 are formed in the inner surface of the body of the casing extending longitudinally thereof forming side walls 55, 51 and terminating midway the ends of the casing in shoulders 56 at the inner ends thereof.

A removable hollow cylindrical barrel 58 is slidably fitted inside the body of the casing 40. The barrel houses locking mechanism of the tumbler type including opposed spring-pressed movable bolts 60, 60 normally extending through slots 62 formed in the side wall of the body of the barrel to the outside of the body. The bolts are disposed in offset transverse planes as best seen in FIG. 6.

At one end, the body of the barrel is closed by a wall 64 formed with an annular flange 66 overlying the outer surface of the body of the barrel. The other end of the body of the barrel is open. A key hole 68 is formed in the center of the closure wall 64 communicating with the interior of the body of the barrel, housing the locking mechanism. When the barrel is fitted into the casing 40, the bolts 60 pass through the notches in the inner shoulder 46 of the head 42 of the casing and ride in the recesses 54 formed on the inner surface of the body of the casing. When the barrel is slid home inside the body of the casing 40, the flange 66 seats on the shoulder 46 of the head of the casing, and the flange 66 and closure wall 64 are flush with the outer edge of the head 42 of the casing as seen in FIG. 4. The bolts 60 extend into the recesses 54 inwardly of the inner surface of the body of the casing so that when the bolts are in this position, the barrel cannot be rotated as the side walls 55 of the recesses are in the path of movement of the bolts 60 when the barrel is rotated. Accordingly, the bolts must be retracted into the interior of the barrel out of the way of the side walls of the recesses before the barrel can be rotated. This is accomplished by the key 70 which by the single operation of merely inserting the key through the keyhole 68 and into the interior of the barrel retracts the bolts 60 into the body of the barrel 58 away from the side walls of the recesses.

Accordingly, when the barrel 58 is in threaded position on the stem 36 as shown in FIG. 4, the hub cap 12 cannot be removed as it is locked in position by the barrel and stem. In order to get the hub cap off, it is necessary to insert the key 70 retracting the bolts and permitting turning of the barrel.

In assembling the hub cap 12 and locking mechanism 28, a washer 72 is placed over the body of the casing 40 and against the under surface of the head 42 and the body and washer inserted through the central opening 23 in the hub cap 12 until the head 42 rests against the outer surafce of the body of the hub cap. A pair of lock nuts 72' and 74 are then threaded onto the threads 52 on the body of the casing 40 to lock the body in position. The hub cap 12 with the outer casing 40 carried thereby is then fitted in position on the brake drum 14 of the wheel 10 with the casing 40 in line with the stem 36 of the adapting means formed on the grease cap 24. The dimensions of the casing 40 and stem 36 are such that the casing will slide over the stem until its inner end is adjacent the nut 38. When the parts are thus positioned, the key 70 is inserted into the barrel 58 through the keyhole 68 thereby retracting the bolts 60, 60 whereupon the barrel is inserted into the casing 40 until the inner threaded end of the barrel engages the free threaded end of the stem 36. By turning the key in the barrel, the barrel is rotated on the stem 36, the barrel moving inwardly to the locking position shown in FIG. 4. The barrel is thus locked to the stem and the hub cap 12 is accordingly locked to the grease cup 24 of the brake drum 14 against movement. The key 70 is then removed.

In FIGS. 8 and 9, the locking mechanism 28' is shown applied to an automobile 80 for use in locking a hood 82 against unauthorized opening. Herein the barrel of the locking mechanism is threaded onto an upright threaded post 84 secured to the top wall 86 of a water radiator 88 at the front of the automobile below the hood 82. The locking mechanism 28' is mounted on the hood 82 at the front thereof, the casing 40' being fitted into an opening 90 formed in the hood over the water radiator. The barrel of the locking mechanism is adapted to be threaded onto the threaded post 84 by means of the key 70 whereby the hood 82 is locked in position. The key 70 is necessary to unthread the barrel off of the post 84 for lifting the hood.

In FIG. 10, a modified form of adapting means whereby the locking mechanism 28" is adapted to lock the trunk cover 90 to the floor 92 of the automobile is shown. The adapting means includes an elongated round rod 94 threaded at its top end as indicated at 96. The bottom end of the rod is pivotally mounted on an upstanding bracket member 98 by a pivot pin 99. The bracket has a base 100 fixed to the floor 92 of the automobile. A coil spring 102 having one end secured to a perforated ear 104 formed on the post adjacent its bottom end and having its other end fastened to an eye 106 formed on an upright post 108 secured to the floor urges the post rearwardly and a pawl 110 fixed on pivot pin 99 limits the rearward movement of the post 94.

In using the locking mechanism 28" for this purpose, the outer casing 40" is fitted in an opening 23" in the trunk cover adjacent the free rear end thereof, the casing being positioned so that when the trunk cover 90 is swung closed, the open end of the casing 40" overlies the top threaded end 96 of the post 94 so that the barrel of the locking mechanism inside the casing 40" is adapted to be threaded onto the top of the post 94 thereby locking the trunk cover 90 to the floor of the automobile. The barrel is turned by means of the key 70. In locking the trunk cover, and in order to unlock the trunk cover, it is necessary to insert the key into the barrel and turn the barrel.

Referring now to the modification of the invention shown in FIGS. 11 to 13, inclusive, in FIG. 11 a conventional hub cap 12a is illustrated. The hub cap 12a has a circular body with a central opening 23a closed by a removable closure plate 116 bearing a design 118. The closure plate serves also as a decorative plate. A valve hole 120 is formed adjacent the periphery of the body of the hub cap.

In accordance with the present invention, the closure cap 116 is removed and a dish-shaped closure plate 126 substituted for closing the opening 239 in the hub cap. The closure plate 126 is held in closing position by means of spaced radial lugs 128 on the periphery of the body of the plate coacting with the fingers 124 radiating from the central opening 239 of the hub cap 12a. The closure plate 126 is formed with a central opening 130 in which is fitted the locking mechanism 28a.

The locking mechanism 28a includes an outer casing 40a similar to casing 40 secured to the inner surface of the body of the plate 126 and a barrel 58a fitted in the end of the casing mounting the plate 126, the threaded barrel extending into the casing 40a. For use with the locking mechanism 28a, adapting means is provided for securing the barrel 58a to the grease cup 24a fixed to the body of the automobile. This adapting means includes a flanged tubular adapter 30a, the flange being spot welded to the face of the grease cup as indicated at 132. An external threaded stem or post 36a is fixed to the adapter 30a by threading one end thereof into the adapter. The barrel 58a is threaded onto the stem 36a by means of the key 70a and is unscrewed from the stem by the same key. When the barrel is screwed onto the stem, the hub cap 12a is fixed in position against unauthorized removal, and when the barrel is unscrewed off of the stem, by the key, the hub cap 12a may be removed.

FIGS. 14 and 15 illustrate another modified form of means for adapting the grease cup 24x to the locking mechanism of the invention. For this purpose, a box-shaped member 140 is formed with wings 142 radiating from the edges of the open end of the body of the box-like member. The box-like member 140 is adapted to cover a lock nut 30x fitted therein. The body of the box-like member has a central hole 144 aligned with the internally screw threaded hole 146 in the lock nut 30x. The wings rest flatwise on the outer face of the grease cup 24x and are spot welded thereto as indicated at 148 to hold the lock nut against the face of the grease cup.

A threaded stem or post 36x is adapted to extend through the hole 144 in the box-like member and to be threaded into the lock nut 30x, whereby the barrel of the locking mechanism such as the barrel 58a of the locking mechanism 28 may be threaded and fastened onto the stem or post for locking the hub cap against unauthorized removal. A lock nut 38x may be threaded onto the stem 36x to lock it against displacement.

The means disclosed for adapting the grease cup to receive the locking mechanism of the invention are readily attached to the conventional axle structure and may be attached at service stations, repair shops, garages by the attendants and for this purpose the invention comprehends a tool, such as a template 150 shown in FIG. 16 and FIG. 17. This template 150 comprises a hollow cylindrical body 152 closed at one end by an integral wall 154 and being open at the opposite end. A series of holes 156 are formed in the closure wall 154 in annular formation around the center of the wall, the holes communicating with the interior of the body of the template.

In using the template 150 for fixing an adapter device such as the block 30 of FIG. 4, the nut 30x of FIG. 14 or the flanged tube 30a of FIG. 12 onto a grease cup, such as the grease cup 24 shown, the adapter is placed on the face of the grease cup as shown in FIG. 17 and the template 150 placed over the grease cup and adapter, with its holes in line with the periphery of the seated adapter device, whereupon fastening substance such as solder 160 is poured through the holes 156 onto the junctures between the seated adapter and the face of the grease cup. FIG. 17 illustrates such an operation completed and the template 150 being removed leaving the solder 160 in fastening position.

What is claimed is:

1. A locking mechanism of the kind described for locking a hub cap, said mechanism comprising an adapter member anchored to a grease cup of the automobile and projecting outwardly therefrom, said adapter member having a central threaded core therein, an elongated threaded stem threaded at one end into said adapter member and projecting radially from the member, a key controlled cylindrical lock assembly having a tubular casing open at both ends, an enlarged head on one end of the casing, the hub cap having a central opening of a size to snugly receive the tubular casing, a lock nut on the casing cooperating with the hub cap to rigidly secure the lock assembly concentrically to the hub cap with the head of the casing abutting the exterior surface of the hub cap, a lock barrel rotatable in the tubular casing by a key and internally threaded at its inner end for threaded engagement with the projecting threaded end of the stem, said barrel being removable from the casing when out of threaded engagement with said stem, said casing being provided with spaced recesses in the inner surface thereof extending longitudinally of the casing, said grease cup, adapter and stem constituting a rigid unit, spring pressed movable bolts carried by the barrel adapted to coact with the side walls of the recesses to prevent rotation of the barrel, said bolts being key actuated for retraction out of coacting position with said side walls, the adapter member comprising a cylindrical block welded to the grease cup, and a lock nut on the stem coacting with the block to lock the stem in position in the block.

References Cited

UNITED STATES PATENTS

| | | | |
|---|---|---|---|
| 952,917 | 3/1910 | Manlet | 70—230 |
| 2,291,217 | 7/1942 | Hoecker | 301—10 |
| 2,328,301 | 8/1943 | Shaw | 70—259 |
| 2,722,822 | 11/1955 | Thomas | 70—167 |
| 2,762,469 | 9/1956 | Lyon | 188—264 |
| 2,885,931 | 5/1959 | McDonald et al. | 70—167 |

RICHARD E. MOORE, Primary Examiner

R. L. WOLFE, Assistant Examiner

U.S. Cl. X.R.

70—259